United States Patent Office 3,457,214
Patented July 22, 1969

3,457,214
LOW TEMPERATURE VULCANIZING COMPOSITION AND ARTICLE MADE THEREFROM
Frank J. Modic, Scotia, N.Y., assignor to General Electric Company, a corporation of New York
No Drawing. Filed Dec. 15, 1965, Ser. No. 514,140
Int. Cl. C08g 47/04, 47/10
U.S. Cl. 260—37    6 Claims

ABSTRACT OF THE DISCLOSURE

Compositions which cure to transparent silica reinforced potting and molding materials comprise (1) a silanol-terminated polydiorganosiloxane in which from 11% to 13.3% of the organo groups are phenyl, with substantially all of the remaining groups being methyl, (2) a resinous copolymer of trimethylsiloxane units and $SiO_2$ units, and (3) a reinforcing silica filler.

---

This invention relates to a new low temperature curing composition and to an article made from that composition. More particularly, this invention relates to a two-component low temperature vulcanizing organopolysiloxane composition which contains reinforcing silica fillers for forming a high strength article, such as a clear, "see-through" mold, and to that clear, transparent article. The composition of matter consists essentially of (1) a resinous copolymer of $R_3SiO_{0.5}$ units and $SiO_2$ units, (2) a silanol-terminated diorganopolysiloxane fluid, and (3) a reinforcing silica filler. The composition is catalyzed by a curing agent for (1) and (2).

So-called "room temperature vulcanizing" compositions are well known in the art and generally comprise, as a base material, a silanol-terminated diorganopolysiloxane material. When it is desired to form an organopolysiloxane material with a thick cross section that can be cured at low temperatures, for example at or near room temperature, it is desirable that a two-component system be utilized, rather than the one-component system where thick section cures are achieved only with greater difficulty. On the other hand, most two-component low temperature vulcanizing organopolysiloxane systems utilize ethyl silicate as the cross-linking agent. When a reinforcing silica filler is blended into a composition containing a silanol-terminated diorganopolysiloxane and ethyl silicate, a gel is formed and the mixture may solidify, while standing at room temperature for a very short period of time, even prior to the addition of a curing agent. Such a system is obviously unsuitable for commercial application. Due to the increased strength of polymeric systems containing reinforcing silica fillers and to the reduced cost which is inherent in replacing a portion of the organosiloxane polymer with such a silica filler to achieve the same volume, a means of combining a reinforcing silica filler with a two-component low temperature vulcanizable organopolysiloxane system has been sought.

In accordance with the present invention, I have discovered that when a resinous copolymer consisting of $R_3SiO_{0.5}$ units and $SiO_2$ units is used as a cross-linking agent for the silanol-terminated diorganopolysiloxane fluid, a quantity of reinforcing silica filler can be blended into the mixture without any significant effect upon the fluidity of the mixture prior to the addition of catalyst and application of the material for the desired use. Thus, by using this resinous copolymer of $R_3SiO_{0.5}$ units and $SiO_2$ units as the cross-linking agent in a two-component low temperature vulcanizing organopolysiloxane system, in place of the formerly used ethyl silicate cross-linking agent, the previously described benefit of including a reinforcing silica filler can be realized.

Additionally, the silanol-terminated diorganopolysiloxane fluid can be formulated with a refractive index such that, when the reinforcing silica filler and the sinuous copolymer of $R_3SiO_{0.5}$ units and $SiO_2$ units are blended in, and the mixture cured, a potting or molding resin which is clear, transparent, and strong results. Thus, this invention also relates to the clear, transparent, strong material formed from curing the composition described above when the refractive index of the silanol-terminated diorganopolysiloxane fluid is in a particular range.

Resinous copolymers of $R_3SiO_{0.5}$ units and $SiO_2$ units are well known in the art, being described for example in U.S. Patent 2,857,356 of John T. Goodwin, Jr. The resinous copolymer is the cohydrolysis product of a trialkylhydrolyzable silane and an alkyl silicate, either in the monomeric or polymeric state, the cohydrolysis product containing a plurality of silicon-bonded hydroxy groups. The trialkylhydrolyzable silane used in the preparation of the resinous copolymer is one which corresponds to the general formula:

(1)    $R_3SiX$ where R is a lower alkyl radical, e.g., methyl, ethyl, propyl, isopropyl, butyl, isobutyl, etc., and X is a hydrolyzable group, e.g., halogen, such as chlorine, bromine, fluorine, etc., an alkoxy radical, such as, methoxy, ethoxy, etc.; or an acyloxy radical, etc. It is essential that R be a lower alkyl radical since higher alkyl radicals undesirably slow down the hydrolysis of the $R_3SiX$ compound and cause a different type of intercondensation with the alkyl silicate, thus leaving two products which are not as desirable for the present application. Obviously, R may be the same or different lower alkyl radicals.

The alkyl silicate employed for cohydrolysis with the trialkylhydrolyzable silane is one which corresponds to the general formula:

(2)    $(RO)_4Si$ or a polyalkyl liquid silicate obtained by hydrolyzing the monomeric silicate to a stage where it is still liquid and preferably has a viscosity, for ease of handling, below about $0.1 \times 10^6$ centipoises. R in Formula 2 is the same as R described for the trialkylhydrolyzable silane and again can be the same or different lower alkyl radicals.

The method of formation of the resinous copolymer of $R_3SiO_{0.5}$ units and $SiO_2$ units is completely described in the aforementioned Goodwin patent and that portion of the Goodwin patent is herein incorporated by reference. The ratio of the trialkylhydrolyzable silane and the alkyl silicate employed in forming the resinous copolymer is the same as the finally desired ratio of $R_3SiO_{0.5}$ units to $SiO_2$ units in the resinous copolymer. For the present invention, the ratio of $R_3SiO_{0.5}$ units to $SiO_2$ units should be in the range of from about 0.5:1 to 1:1, and preferably, the ratio is in the range of from about 0.525:1 to 0.775:1.

The silanol-terminated diorganopolysiloxane which is employed in the composition of the present invention has the formula:

(3) 
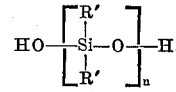

where R' is a monovalent hydrocarbon radical and $n$ is an integral number of from about 250 to 1500. Preferably, $n$ is an integral number of from about 250 to 1000. Among the monovalent hydrocarbon radicals which R' represents are alkyl radicals, such as methyl, ethyl, propyl, butyl, octyl, etc.; cycloalkyl radicals, such as, cyclopentyl, cyclohexyl, cycloheptyl, etc.; aryl radicals, such as, phenyl, tolyl, xylyl, ethylphenyl, naphthyl, biphenyl, etc. These silanol-terminated diorganopolysiloxanes are, as previously described, fluids, and generally have viscosities in the range of from about 500 centistokes to 100,000 centistokes, at 25° C. Preferably, the material is a dimethylpolysiloxane fluid having silanol terminals with a viscosity of from about 500 centistokes to 22,500 centistokes at 25° C. However, when it is desired to form a clear, transparent, high strength material, such as for potting, the silanol-terminated fluid of Formula 3 must have a refractive index in the range of from about 1.45 to 1.46. This can be accomplished by forming a fluid of Formula 3 where the substituent R' is both methyl and phenyl, the amount of phenyl being within a particular range. For a silanol-terminated diorganopolysiloxane fluid with a refractive index of from 1.45 to 1.46, from 11% to 13.3% of the R' substituent should be phenyl, with the remainder being substantially all methyl.

To form the high strength, transparent material any of a variety of reinforcing silica fillers can be employed. These are processed silica fillers which generally have a surface area of from about 125 to 225 square meters of surface area per gram of material. Included among the reinforcing silica fillers are such precipitated silicas as Hi-Sil X303, manufactured by Columbia Southern Chemical Co. and Ultrasil VN-3, manufactured by Füllstoff-Gesellschaft, and fumed silicas, such as Cab-O-Sil, manufactured by Godfrey Cabot, Inc. Prior to incorporation in the mixture of the silanol-terminated diorganopolysiloxane fluid and the resinous copolymer of $R_3SiO_{0.5}$ units and $SiO_2$ units, these reinforcing silica fillers can be treated with other organosilicon materials. The treatment of the silica fillers with organosilicon materials are described, for example, in U.S. Patents 2,938,009—Lucas and 3,004,859—Lichtenwalner. These patents describe the treatment of silica fillers with such materials as organochlorosilanes and organocyclopolysiloxanes.

The catalyst which is employed for curing the composition of the present invention can be selected from a large group of catalysts which have previously been employed for curing organopolysiloxane compositions having silicon-bonded hydroxyl groups. Among these catalysts is the combination of an organic compound containing an epoxy group, that is, a group with the formula:

(4)
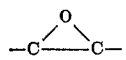

and an amine selected from the class consisting of primary amines, secondary amines, and tertiary amines, as described in U.S. Patent 3,205,197—Cohen et al. The portion of the Cohen et al. patent relating to this catalyst system is hereby incorporated by reference. Additionally, tin soaps and lead soaps can be utilized for curing the composition of the present invention. Included among these tin and lead soaps are such materials as stannous octoate, dibutyltindilaurate, lead octoate, and other such soaps having radicals such as the resinate, linoleate, stearate, oleate, and even lower acid radicals, such as acetate, butyrate, etc.

A wide latitude is allowable in the amount of the previously described materials utilized in the present invention. For each 100 parts of the silanol-terminated diorganopolysiloxane of Formula 3 there can be employed from about 5 to 25 parts, by weight, of the resinous copolymer of $R_3SiO_{0.5}$ units and $SiO_2$ units. This resinous copolymer acts essentially as a cross-linking agent for the silanol-terminated diorganopolysiloxane of Formula 3. The filler level used in the present composition can vary from about 15 parts to 65 parts, by weight, of filler for each 100 parts of the silanol-terminated diorganopolysiloxane fluid of Formula 3 and the catalyst level can be varied from about 0.02% to 1% of the metal in the metal soap or the amine in the combination of the organic epoxy compound and amine, previously described, based on the total of the silanol-terminated diorganopolysiloxane and the resinous copolymer of $R_3SiO_{0.5}$ units and $SiO_2$ units.

To employ the composition of the present invention for potting or encapsulating, the resinous copolymer of $R_3SiO_{0.5}$ units and $SiO_2$ units, the silanol-terminated diorganopolysiloxnae fluid, and the reinforcing silica filler are merely blended together in any convenient fashion such that a homogeneous mixture is insured. This mixture can be catalyzed immediately or can be stored for an extended period of time and catalyzed immediately prior to use. In any event, the catalyst should not be added to the mixture of the three components, just described, until just prior to use. Without catalysts, the mixture can be stored for long periods, for example, from six months to one year or more, without adverse effect. However, on addition of the catalyst the composition begins to cure and, even at room temperature, the pot life is less than 24 hours.

When it is desired to form a conformal coating from the composition of the present invention, it is often advantageous to apply the composition from a solvent solution to reduce the working viscosity of the mixture so as to allow even the intricate detail of the item to be coated to be filled with the composition of the present invention. When a solvent solution is desired, the solvent employed can be selected from a broad range of hydrocarbon materials, either aliphatic or aromatic. Among the solvents which can be used are such materials as pentane, hexane, heptane, cyclohexane, cyclohexene, benzene, toluene, xylene, etc. The solution should contain between 30% and 75% solids.

The composition, after addition of catalysts, will cure at room temperature in about 24 hours and attain its ultimate properties in about 96 hours. If the mixture is heated to 100° C., cure can be accomplished in about 1 hour, while at 150° C. cure is accomplished in about 30 minutes. Because of the expansion coefficient of the organopolysiloxanes, 150° C. is about the maximum temperature which can be used for curing or the potting or coating material will expand to such a degree that an accurate mold or coating is not obtained. With the solvent systems, a temperature of at least 80° C. should be utilized to insure removal of solvent prior to firming of the organopolysiloxane composition.

The following examples are given as illustrations of the practice of the present invention and should not be considered as limiting in any way the full scope of the invention as covered in the appended claims. All parts are by weight.

Example 1

A mixture was prepared containing 500 parts of a silanol-terminated dimethylpolysiloxane fluid with a viscosity of 750 centistokes at 25° C. and an approximate average formula:

(5)
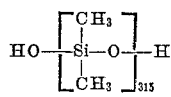

and 150 parts of a fumed silica filler with a surface area of about 200 square meters per gram treated with twenty parts of octamethylcyclotetrasiloxane according to the method of the aforementioned Lichtenwalner patent. This mixture was blended in a change can mixer at a temperature of about 100°–150° C. until it was homogeneous (about 90 minutes). To 130 parts of this mixture was added 15 parts of a resinous copolymer of $(CH_3)_3SiO_{0.5}$ units and $SiO_2$ units in a ratio of 0.77:1, the resinous copolymer was blended in and the new mixture deaerated. The mixture of the silanol-terminated dimethylpolysiloxane fluid, the resinous copolymer of $(CH_3)_3SiO_{0.5}$ units and $SiO_2$ units, and the treated fumed silica filler was catalyzed with 3 parts of a 10% solution of tin octoate in octamethylcyclotetrasiloxane, the catalyzed mixture placed on a tin-plated casting tray and cured for 17 hours at a temperature of 100° C. A 100 mil thick strip with dimensions of ¼ inch by 4 inches was cut from the slab and tested on an Instron machine. The test strip had a tensile strength of 330 p.s.i. and an elongation of 125%.

Example 2

In this example a silanol-terminated diorganopolysiloxane material with the approximate average formula:

(6) 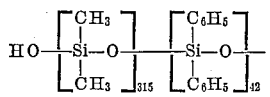

and having a viscosity of approximately 1550 centistokes at 25° C., was employed. A quantity of 1000 parts of the fluid of Formula 6 was blended with 300 parts of the fumed silica filler described in Example 1 in a change can mixer at about 100° C. to 150° C. A mixture was prepared containing 30 parts of the resinous copolymer of $(CH_3)_3SiO_{0.5}$ units and $SiO_2$ units, described in Example 1, and 250 parts of the mixture of the fluid of Formula 6 and the fumed silica filler. This mixture was deaerated and catalyzed with 5 parts of a 10% solution of tin octoate in octamethylcyclotetrasiloxane. The mixture was poured onto a tin-plated casting tray and cured for 16 hours at 65° C. A 100 mil thick strip, ¼ inch by 3 inches was cut from the slab and tested on an Instron machine. This material showed a tensile strength of 500 p.s.i. and an elongation of 200%. Additionally, due to the selection of the silanol-terminated diorganopolysiloxane fluid and the filler, the cured slab was both clear and transparent.

Example 3

In a change can mixture, a blend was prepared of 1000 parts of a silanol-terminated diorganopolysiloxane fluid with a viscosity at 25° C. of approximately 1500 centipoises, having the approximate average formula:

(7) 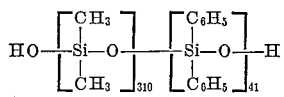

and 300 parts of a precipitated silica filler with a surface area of about 160 square meters per gram. A quantity of 100 parts of the blend described above was hand-mixed with 16 parts of the resinous copolymer of $(CH_3)_3SiO_{0.5}$ units and $SiO_2$ units described in Example 1. A film was formed by curing a mixture of 50 parts of the three-component mixture, just described, with 0.12 part of butyl glycidyl ether and 0.2 part of dimethyl soya amine for 16 hours at 65° C. A strip 75 mils thick, and with dimensions of ¼ inch by 3 inches was cut from this film and tested on an Instron machine. The material had a tensile strength of 415 p.s.i. and an elongation of 450%. Additionally, the film was clear and transparent.

Example 4

To show the stability of a potting composition formed according to the present invention with a reinforcing silica filler as compared with a potting composition utilizing ethyl silicate as a cross-linking agent with a reinforcing silica filler, two materials were prepared. A mixture was prepared containing 500 parts of a silanol-terminated diorganopolysiloxane with a viscosity at 25° C. of about 1650 centipoises, having the approximate average formula:

(8) 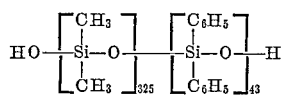

and 125 parts fumed silica with a surface area of about 200 square meters per gram having been treated with about 20 parts of octamethylcyclotetrasiloxane for each 100 parts of the fumed silica. This blend was mixed and heated at 100–105° C. for 1½ hours and was then passed over a 3-roll paint mill. The final viscosity of the material was 26,000 centipoises at 25° C.

A first portion of 125 parts of the above-described mixture was blended with 3 parts of condensed ethyl silicate and allowed to stand overnight. The viscosity measurement the next day was 1,360,000 centipoises, indicating that the combination of the ethyl silicate and the reinforcing silica filler had caused substantial curing of the silanol-terminated diorganopolysiloxane material.

A second portion of 125 parts of the blend of filler and silanol-terminated diorganopolysiloxane was mixed with 15 parts of a resinous copolymer of $(CH_3)_3SiO_{0.5}$ units and $SiO_2$ units in a ratio of 0.77:1. These materials were mixed, allowed to stand overnight, and a viscosity measurement taken. The viscosity after standing overnight was 10,000 centipoises and, six months later, the viscosity was essentially unchanged. However, by blending the proper amount of catalyst with this potting resin, a cured, clear, transparent potting material could be formed.

Example 5

A silanol-terminated diorganopolysiloxane fluid was formed by heating, at 180° C., a mixture of 1,000 parts of octamethylcyclotetrasiloxane and 2.2 parts of a 0.45% solution of potassium hydroxide in octamethylcyclotetrasiloxane. When this material had polymerized, a quantity of 350 parts of octaphenylcyclotetrasiloxane was added and heating was continued for about 6 hours. A few drops of distilled water were added, while maintaining the temperature at 180° C., and a silanol-terminated diorganopolysiloxane fluid was formed with a viscosity of 1200 centipoises at 25° C. and a refractive index of 1.4526. This corresponds to the approximate average formula:

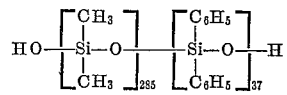

A potting compound is formed by blending 600 parts of the fluid (9) described above with 167 parts of a 60% solid solution of a resinous copolymer of $(CH_3)_3SiO_{0.5}$ units and $SiO_2$ units in a ratio of 0.55:1 in xylene, and 210 parts of a precipitated silica filler with a surface area of about 150 square meters per gram. The mixture is blended and is catalyzed with 12.5 parts of tin octoate. A prototype of a precision gear for a timing device is placed into a cavity and the just prepared organopolysiloxane composition is poured around it and deaerated. The entire assembly is placed into an oven and heated at 50° C. for a period of 24 hours. The prototype, now encased in the solidified organopolysiloxane, is removed from the oven and the polysiloxane carefully removed from the prototype. The solidified organopolysiloxane is clear, transparent, and strong and is used for casting epoxy gears for use in the timing device. The transparency of the mold allows detection of voids prior to curing of the epoxy resin and also allows an inspection of the casting to be certain that an over-concentration of the amine catalyst used to cure the epoxy resin does not develop. Such transparent molds can also be utilized, for example, in casting prosthetic devices to assure that no foreign bodies are present in the device.

What I claim as new and desire to secure by Letters Patent of the United States is:

1. A composition of matter consisting essentially of:
   (1) a silanol-terminated organopolysiloxane fluid having a refractive index of from 1.45 to 1.46 and having the formula:

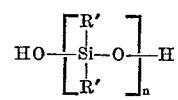

where $n$ is an integral number of from about 250 to 1500, 11% to 13.3% of the R' groups are phenyl radicals and the remaining R' groups are substantially all methyl radicals,
   (2) a resinous copolymer of $(CH_3)_3SiO_{0.5}$ units and $SiO_2$ units in a ratio of from 0.5:1 to 1:1, and
   (3) a reinforcing silica filler.

2. The composition of claim 1 wherein $n$ is from 250 to 1,000.

3. The composition of claim 1 wherein the ratio of $(CH_3)_3SiO_{0.5}$ units to $SiO_2$ units is from 0.525:1 to 0.775:1.

4. The composition of claim 1 where, for each 100 parts of the silanol-terminated diorganopolysiloxane fluid, there are from 5 to 25 parts, by weight, of the resinous copolymer of $(CH_3)_3SiO_{0.5}$ units and $SiO_2$ units, and from 15 to 65 parts, by weight, of the reinforcing silica filler.

5. The cured composition of claim 4.

6. A clear, transparent, mold formed by curing the composition of claim 1 with a catalyst selected from the class consisting of lead soaps, tin soaps, and the combination of an organic compound containing an epoxy group and an amine selected from the class consisting of primary amines, secondary amines, and tertiary amines.

References Cited

UNITED STATES PATENTS

| | | | |
|---|---|---|---|
| 3,057,469 | 10/1962 | Bond | 260—825 |
| 3,205,283 | 9/1965 | Modic | 260—825 |
| 3,036,985 | 5/1962 | Daudt | 260—37 X |
| 3,205,197 | 9/1965 | Cohen et al. | 260—46.5 |

FOREIGN PATENTS 1,311,578  10/1962  France.

MORRIS LIEBMAN, Primary Examiner

L. T. JACOBS, Assistant Examiner

U.S. Cl. X.R.

260—825